July 30, 1946.    J. J. DURRETT    2,404,831
ADJUSTING DEVICE FOR CONTROL VALVES
Filed July 11, 1945

Inventor
James J. Durrett
By Dodge and Jones
Attorneys

Patented July 30, 1946

2,404,831

UNITED STATES PATENT OFFICE 2,404,831

ADJUSTING DEVICE FOR CONTROL VALVES

James J. Durrett, Watertown, N. Y., assignor to The New York Air Brake Company, a corporation of New Jersey Application July 11, 1945, Serial No. 604,319

2 Claims. (Cl. 188—71)

This invention relates to adjusting devices for pressure control valves and the like, and is particularly intended for use in hydraulic systems.

Most pressure control mechanisms are adjusted by changing the loading of a coil compression spring. Where high pressures are encountered the stress on the spring is substantial, and if the mechanism is subject to vibration an adjusting nut of ordinary pitch may creep causing an undesired change in adjustment.

The present invention provides a friction clamp which is either fully engaged or completely released. It is push-button actuated so as to be readily manipulable. The push-button mechanism is a type which indicates visually the condition of the clamp; i. e., whether it is engaged or released.

Figure 1:
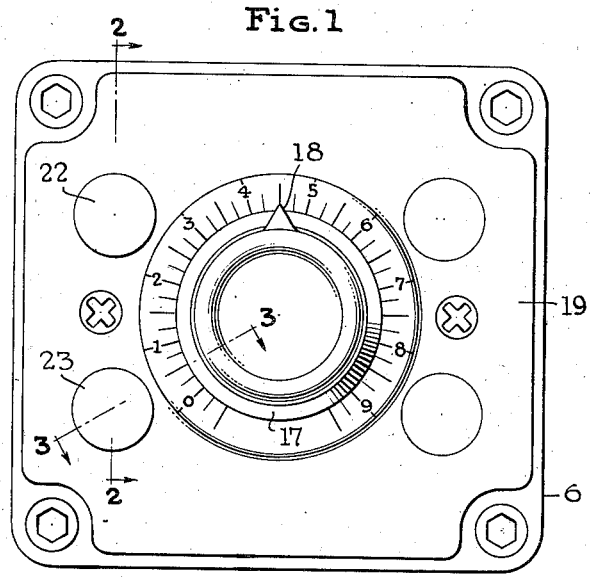
Figure 1:
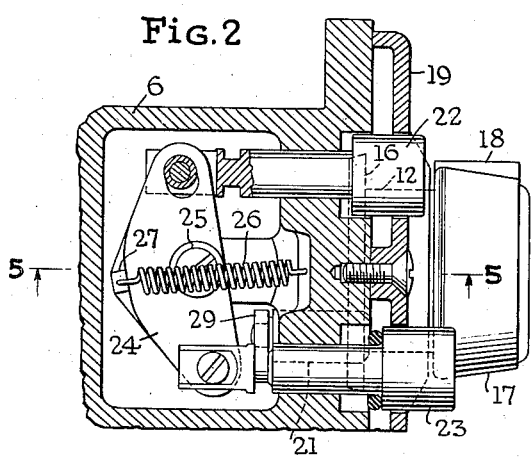
Figure 1:
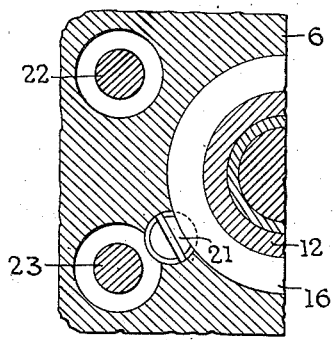
Figure 1:
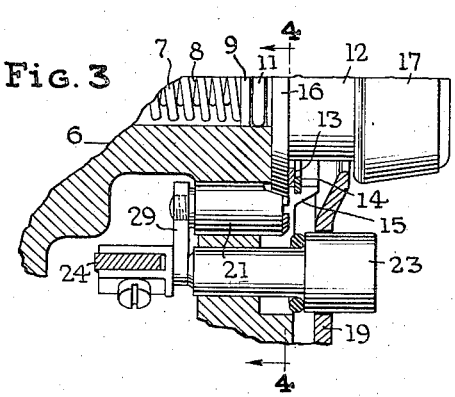
Figure 1:
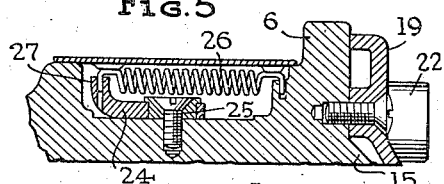

A commercial embodiment of the invention will now be described by reference to the accompanying drawing, in which:

Fig. 1 is a front elevation.
Fig. 2 is a section on the line 2—2 of Fig. 1.
Fig. 3 is a section on the line 3—3 of Fig. 1.
Fig. 4 is a section on the line 4—4 of Fig. 3.
Fig. 5 is a section on the line 5—5 of Fig. 2.

The invention will be described as applied to a controller of the type described and claimed in the application of David J. Whittingham, Serial No. 579,867 filed February 26, 1945, and assigned to applicant's assignee. Immaterial details of the controller are not illustrated.

A portion of the body or housing of the controller appears at 6. The springs 7, 8 are the loading springs whose stress is to be adjusted and 9 is the adjustable spring seat, with sealing ring 11. A nut 12 is threaded on the outer end of spring seat 9 and is swiveled in body 6 by a thrust ring 13 held by a snap ring 14 which enters an annular groove in rim 15 formed on housing 6. A spline arrangement (not illustrated) holds the spring seat 9 against rotation while permitting it to move axially.

The thrust ring 13 engages a flange 16 formed on nut 12. This flange has a beveled circular periphery which is the surface clamped to hold the nut against rotation.

Fixed on nut 12 is a plastic knob 17 which has a pointer 18 coacting with a graduated dial on the escutcheon plate 19. This plate overlies and is attached to the front of the body 6.

The clamp or lock is a heavy bevel-ended cylindrical plunger 21 mounted in a long guideway formed in a portion of the body 6 to receive it. The beveled end of the plunger enters into wedging engagement with the beveled periphery of the flange 16. It is alternately forced into wedging engagement or fully retracted by a double push-button arrangement actuated by a toggle spring.

The illustrated construction is as follows: Two push-buttons 22, 23 are carried by plungers guided in body 6. The buttons project through apertures in escutcheon plate 19. The plungers have pin-and-slot connections with opposite ends of a rock lever 24 fulcrumed at 25 on body 6. A coil tension spring 26 reacts between the body 6 and a lug 27 on lever 24 and moves past center at mid-position of the lever.

Consequently as the buttons are pressed alternately the lever and buttons snap to opposite limiting positions. A lug 29 connects plunger 21 with the lower push-button plunger so that the lock is engaged by pushing the upper button and disengaged by pushing the lower button.

The push-button mechanism just described is that which appears at the left in Fig. 1. A duplicate push-button mechanism is shown at the right and may be used to operate an unloader valve or similar devices, not here involved.

The wedging engagement of the beveled end of plunger 21, with the beveled edge of flange 16, gives a highly effective locking action with a spring 26 of moderate strength. Effective wedging action entails the need for accurate guiding of the plunger, and this is secured by making the plunger and its guide of substantial length.

The braking action is such that the brake must be released before the knob 17 can be turned.

What is claimed is:

1. Setting and locking means for adjusting devices comprising in combination a manually rotatable part; an adjusting member controlled thereby; a member having a circular beveled locking surface, said member being connected to turn with said manually rotatable part; a plunger guided in a path approximately parallel with the axis about which rotation of said member occurs, said plunger having a beveled braking surface adapted to enter into wedging engagement with said beveled locking surface when forced toward the same; and a toggle spring mechanism connected with said plunger and shiftable to cause the spring to reverse its direction of action and thus to urge the plunger toward or away from such engagement.

2. Setting and locking means for adjusting devices comprising in combination a manually rotatable part; an adjusting member controlled thereby; a member having a circular beveled locking surface, said member being connected to turn with said manually rotatable part; a plunger guided in a path approximately parallel with the axis about which rotation of said member occurs, said plunger having a beveled braking surface adapted to enter into wedging engagement with said beveled locking surface when forced toward the same; a toggle spring mechanism connected with said plunger and shiftable to cause the spring to reverse its direction of action and thus to urge the plunger toward or away from such engagement; and a pair of selectively actuable push-buttons arranged to shift said toggle spring mechanism.

JAMES J. DURRETT.